United States Patent [19]

Kelly et al.

[11] Patent Number: 4,819,235
[45] Date of Patent: Apr. 4, 1989

[54] MODEM USE MONITOR

[76] Inventors: Robert J. Kelly, 107 Phyllis Dr., Old Tappan, N.J. 07675; Tadhg Kelly, 1093 Sussex Turnpike, Randolph, N.J. 07869

[21] Appl. No.: 126,184

[22] Filed: Nov. 27, 1987

Related U.S. Application Data

[63] Continuation-in-part of Ser. No. 797,166, Nov. 12, 1985, Pat. No. 4,710,929.

[51] Int. Cl.$^4$ ............ H04M 3/08; G06F 11/00
[52] U.S. Cl. ............................. 371/22; 371/15; 379/1; 379/93; 375/10
[58] Field of Search .......... 371/22, 15, 29, 5, 60; 375/10; 370/13; 379/1, 93; 340/825.06, 825.16, 825.5; 364/200, 900

[56] References Cited

U.S. PATENT DOCUMENTS 4,385,384 5/1983 Rosbury ............... 379/93 X
4,471,491 9/1984 Abe ....................... 375/3 X
4,520,233 5/1985 Smith ................... 379/95
4,646,320 2/1987 Krishnan ............... 364/900 X Primary Examiner—Jerry Smith
Assistant Examiner—Robert W. Beausoliel
Attorney, Agent, or Firm—Siegmar Silber

[57] ABSTRACT

A modem use monitor (MUM) is disclosed which is utilizable with one or more groups of modems for analyzing modem defects of the individual modems. Typically, a rotary hunt arrangement of telephone lines for data communications is sequentially served by several modems. For analytical purposes, an intercept device is provided to receive a data carrier detect signal from each modem. The intercept device has been enhanced to receive a plurality of signals and to facilitate defect analysis. Exemplary of the processed signals is the summing of the ring indicator (RI) signal and the data carrier detect (SCD) by means of a logical OR to provide a single test signal which can be examined for a ring-no-answer condition.

31 Claims, 4 Drawing Sheets

MODEM USE MONITOR

BACKGROUND OF THE INVENTION

This application is a continuation of application Ser. No. 06/797,166, filed Nov. 12, 1985, now U.S. Pat. No. 4,710,929.

FIELD OF THE INVENTION

The present invention is related to the monitoring and analyiis of a quantity of modems, and more particularly to a microcomputer-based system that provides modem use information. Such information is provided in the form of a display and in the form of recorded data obtained directly or derived from the monitoring activity. The recorded data in the form of a histogram or computer-generated exception report chart, shows the in-use condition of each modem. From the histogram or chart, one can determine which modems in the system are faulty, and whether too many or a sufficient number or an insufficient number of modems have been employed. In the development of the modem use monitor, it was found that a critical aspect was the production of suitable intercept connectors and related circuitry.

INFORMATION DISCLOSURE STATEMENT

In the course of examination of the parent case, a search was conducted in classes 371/22, 15, 29, 5, 60; 375/10; 370/13; 179/175.2C, 175.3F, 2DP; 340/825.06, 825.16, 825.5, 720; 364/200, 900; 379/1, 93. The search uncovered the patents listed below, which patents are distinguished from the claims in the parent case.

| U.S. Pat. No. | Inventor  | Date Issued |
|---------------|-----------|-------------|
| 3,829,618     | Brandon   | 8/1974      |
| 4,055,808     | Holsinger | 10/1977     |
| 4,215,243     | Maxwell   | 7/1980      |
| 4,385,384     | Rosbury   | 5/1983      |
| 4,446,458     | Cook      | 5/1984      |
| 4,545,011     | Lyon      | 10/1985     |

For the preparation of this continuing application, no additional pre-examination search was performed; however, in preparation for the parent application, two separate pre-examination searches were performed. The first search was conducted in classes 346/33R, 33M, 33MC; and 375/8, and 10 and uncovered the following patents:

| U.S. Pat. No. | Inventor             | Date of Issue |
|---------------|----------------------|---------------|
| 3,286,272     | L. Dege, et al       | 11/15/66      |
| 3,293,605     | L. Moore             | 12/20/66      |
| 3,371,349     | T. J. Schinner, et al.| 2/27/68      |
| 3,414,905     | M. F. O'Brien, et al.| 12/3/68       |
| 3,491,340     | R. L. Richman, et al.| 1/20/70       |
| 3,566,399     | F. E. Weld           | 2/23/71       |
| 3,728,680     | L. Upshur            | 4/17/73       |
| 3,956,601     | H. Harris, et al.    | 5/11/76       |
| 4,047,155     | A. Miller            | 9/6/77        |
| 4,471,348     | C. London, et al.    | 1/1/85        |

The patents to Upshur, '680 and O'Brien et al. '905 teach the printing out of operating conditions for the looms of a textile mill. In Upshur '680 the system provides for the causes of loom stops, namely, filling stops, warp stops, warp out, and mechanical breakdowns. These stoppages are communicated through a binary code to a computer which indicates the cause of the stoppage. The computer has the capability of integrating the loom stations and of ascertaining the condition thereof. The computer further has the associated memory to retain status so that if a filling or warp stop has occurred, it is recorded whether or not the condition has presently cleared. The patent describes the recordation of loom data in the form of reporting cards. These cards are further used to provide weaving loom efficiency as well as other operating data.

In O'Brien et al., a similar textile application for computerized monitoring is provided. Here the reporting is through a record reflected by a scanner associated with a system having voltage signals provided to a patchboard. The description of a permanent record of the causes of shutdowns of the looms being monitored is described. This monitoring is taught as useful for recording downtime of machines other than textile looms.

In Shinner et al. '349, the disclosure teaches a device providing time and event printout of a plurality of circuit breakers which are monitored on a timed basis. Of particular interest in this disclosure is the time and date print unit and the operational information provided. Within the operating section the checking of the operation of the printer to determine if the printer is free of malfunctions is described.

In London et al. '348, a device is shown which, under the control of the microprocess control central processor, a number of analog input signals are scanned. The operation of the scanner is described together with the elements of the monitoring system and the description of the display.

A universal data recording system invented by Arthur Miller teaches display means on a plurality of terminals. In this invention an interrogation is conducted of various detector means.

The second search, was conducted in the following classes, 179/2DP; 375/8 and 10; 340/825.06, 825.16, 825.5, and 722; 364/300; 370/13; 371/5, 15, 22 and 60. The search uncovered the following patents:

| U.S. Pat. No. | Inventor                         | Date of Issue |
|---------------|----------------------------------|---------------|
| 4,498,186     | Hwang et al (AT&T Bell)          | 2/5/85        |
| 4,398,299     | Darling et al (AT&T Bell)        | 8/9/83        |
| 4,398,297     | Hwang et al (AT&T Bell)          | 8/9/83        |
| 4,393,508     | Boudalt (U..Philips)             | 7/12/83       |
| 4,385,392     | Angell et al                     | 5/24/83       |
| 4,385,384     | Rosbury et al (Rascal Data)      | 5/24/83       |
| 4,015,206     | Huntley (GTE Lenkurt)            | 3/29/77       |
| 3,956,601     | Harris et al (Paradyne Corp)     | 5/11/76       |
| 3,952,163     | Couturier et al (Genl Data Commm)| 4/20/76       |
| 3,743,938     | Davis (General Data Comm)        | 7/3/73        |
| 3,622,877     | MacDavid et al(Sanders Assoc)    | 11/23/71      |
| 3,245,066     | Mattlet (Intnatl Std Elec Corp)  | 4/5/66        |
| 3,225,205     | Berkin (IBM)                     | 12/21/65      |
| 3,097,353     | Carter (Epsco Inc)               | 7/9/63        |
| 2,786,988     | Bergman (LM Ericson)             | 3/26/57       |

In the patent to Courturier et al '163, a modem tester is taught in which a frequency division multiplexing transmitter/receiver is described. The operational teachings are described by reference to the waveform diagrams.

In Davis '938, the remote receiver control circuits response to carrier frequency signal is taught.

In Hwang et al '186 the section entitled "Communication Processing" teaches transmitting an acknowledgement, and the flag setting capability of the DDU upon receiving text.

In Rosbury et al '384 a device is described as containing tests for modems, including selftesting in response to the self-test enable (STE) command and end-to-end testing initiated by the test pattern enable (TPE). The patent further teaches the logic states for modem operating conditions and describes information available for determining status such as modem signal quality.

The patent to Harris et al '601 teaches a modem test signal generator and the modem integrity signal derived therefrom.

In the Angell et al '392 patent, the logic operation of a ROM is taught, which ROM compares receive data with transmit data.

The MacDavid et al '877 patent teaches checking modems using a bit test sequence generator and a comparison of the same to a reference bit sequence generator.

The pertinent aspects of the searches have been discussed hereinabove so as to conform with the full disclosure requirements.

SUMMARY

A modem use monitor (MUM) is disclosed which is utilizable with one or more groups of modems for analyzing modem defects of the individual modems. Typically, a rotary hunt arrangement of telephone lines for data communications is sequentially served by several modems. For analytical purposes, an intercept device is provided to receive a data carrier detect signal from each modem.

Recently, the intercept device has been enhanced to receive a plurality of signals and to process the signals through logic circuitry to facilitate defect analysis. Exemplary of the processed signals is the summing of the ring indicator (RI) signal and the data carrier detect (DCD) by means of a logical OR to provide a single test signal which can be examined for a ring-no-answer condition.

A central processor is used to process the data carrier signals from each of the modems, which processor is responsive to the presence and absence of the signals. The monitoring of the signal is provided on a periodic basis, generally every five seconds, and an indication of such response is provided periodically, generally each minute. The modems within each group are numbered and have correspondingly number registers for storing the responses for each modem in number sequence. The central processor has the additional function of examining the registers upon acquisition of each response and ascertaining if all modems lower in the numbered sequence have indication of data carrier present. The MUM also formulates a histogram or, in the alternative, an exception report chart, for recording all responses for a given period. The histogram shows through the arraying of various symbols, the modems with data carrier present with data carrier absent, and modems answering out-of-sequence. The histogram format is readily interpreted so that modem defects such as a ring-no-answer condition and a lock-up condition can be identified. The exception report chart, while it does not provide the user with the modem utilization information, as errors occur provides the listing of errors and date and time thereof.

Besides the improvements in intercept devices, wiring and cabling improvements have made the application more broadly applicable regardless of the original source of the modem unit or the manufacturer provided test points. Along this line, through the use of the improved equipment, the intercept devices in any one location (for instance at a given modem rack) are now by RS-cables joined to an RJ-modular block. This improvement eliminates the wiring harness formation previously required.

In the MUM, the central processor further computes the modem utilization factor in Erlangs according to the following formula:

$$\frac{N_1 + N_2 + N_3 \ldots N_{60}}{60}$$

wherein $N_1$ = number of modems "ON" during minute 1

$N_2$ = number of modems "ON" during minute 2

$N_3$ = number of modems "ON" during minute 3

.
.
.

$N_{60}$ = number of modems "ON" during minute 60

An additional feature includes a memory for storing summarized information from the registers and provides a 24-hour summary chart listing, for each hour, $N_1 + N_2 + N_3 \ldots N_{60}$ so that an overview of the activity for each day is displayed. A yet further additional feature is a display panel for displaying the ring signal and the data carrier detect signal status for each modem. The display panel has a light emitting diode for each modem which, when illuminated, shows the presence of ring and/or data carrier detect at the modem.

DESCRIPTION OF THE PREFERRED EMBODIMENTS

Figure 1:
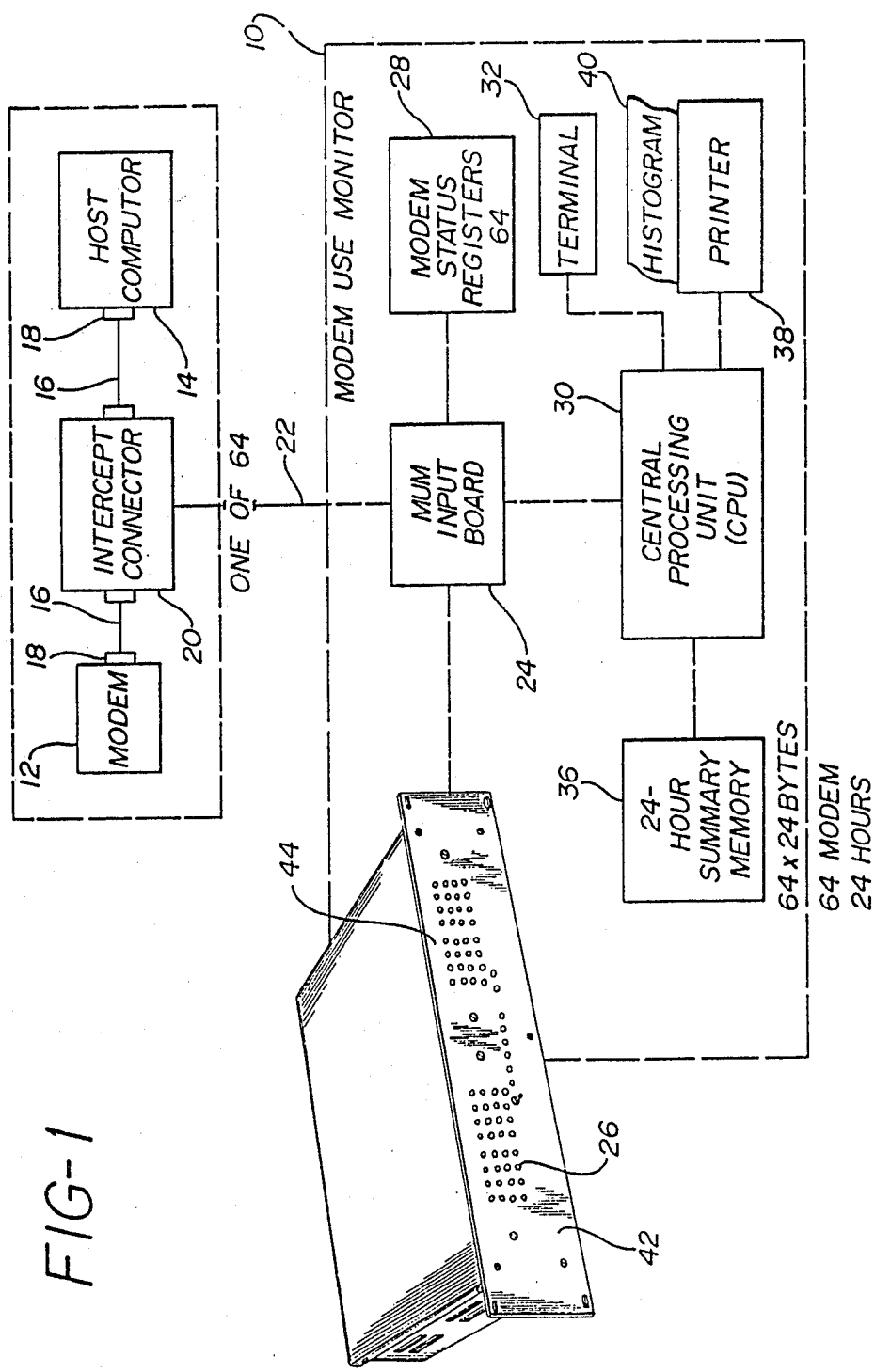
FIG. 1 is a system block diagram of the modem use monitor of the present invention and further shows the relationship among the modem, the intercept connector, the host computer, and the modem use monitor.

In general terms, the Modem Use Monitor (MUM) System of the present invention is applied to quantities of modems which, in turn, are connected directly to a group of leased telephone lines or, alternatively, to a group of telephone lines by automatic answering through a dial up (rotary hunt) system. The MUM system enables one to isolate problems and ascertain (1) whether the problems are in the modems, the data terminal equipment, or the telephone company lines; (2) the nature of the modem problem; (3) indication if too many or too few modems are dedicated to the application; and, (4) indication of trends as to increasing or decreasing use of the overall application.

Included in this disclosure is an intercept connector which device, when connected between a modem (DCE) and terminal (DTE), provides a means of inserting the MUM System at the interface intermediate the modem and the terminal equipment. The intercept connector allows the Modem Use Monitor the ability to monitor various signals at the interface as well as to provide signals into predetermined interface. For the auto answer modem in the dial up application, the modems are usually connected to a telephone company rotary hunt group. In this application a single telephone number is provided to the users and when that number is dialed, the telephone company equipment seeks out an unused telephone line to connect the call. In a normal condition the modems and telephone lines are idle and awaiting a call. When a call comes in, the telephone company injects into the telephone line a ring voltage. This condition is detected by the modem and the ring indicator is activated to follow the ring voltage applied by the telephone company.

Further, the telephone rotary hunt group is a single telephone number (first line) with circuitry providing access to a number of associated telephone lines. When the number of the first line is dialed, the circuitry searches for an unused telephone line in the group. When an empty line is found, the incoming call is connected thereat and the hunt group processes the next call starting again at the first line. For data communications, automatically answering modems are usually connected sequentially to the telephone lines in a rotary hunt group. If the modem is ready to receive data, the telephone ring is automatically answered and the caller is connected to the modem. Because the automatic answering systems—modems, rotary hunt groups and computers—are by design largely unattended, equipment failures or insufficiencies are often unnoticed. Problems are often only brought to light when users, who have been repeatedly frustated in their attempts to gain access, report the problem. Of the problems attributable to modems, besides insufficiencies, there are two main equipment failure categories, namely (1) a "ring-no-answer" condition, and (2) "lock-up" or no disconnect after caller has disconnected. Of the equipment failures the ring-no-answer condition is the most severe as the unattended telephone equipment will continue to ring the modem whenever it appears in the hunt sequence. With a ring-no-answer condition, the user ringing the defective modem will not be able to gain access to the computer. Conversely, the lock-up condition only removes from service the modem and the telephone line affected, while the user can gain access through adjacent modems and lines. Thus, the lock-up condition reduces system efficiency, whereas the ring-no-answer condition reduces user access and system efficiency.

The modem use monitor requires the ring indicator signal as well as the carrier detect signal and in some cases data terminal ready, data set ready, signal quality detect, transmit data, and receive data. Since each input signal requires a separate input to the MUM System, cost savings can be achieved if these signals can be combined into one input. For dial up modems the best mode intercept connector logically ORs the ring indicator signal with the carrier detect signal. Since these signals do not operate simultaneously in time, the initial raising and lowering of the signal on this input can be detected as the ring. If the signal does not remain high after the ringing, the Modem Use Monitor can determine what carrier did not arrive and that the call was a ring-no-answer condition. (Parenthetically, it is also possible for a modem to ring and carrier not to come up without the modem being defective). If a voice telephone dials the modem, then the modem will ring, and in response to the ringing, it will answer the phone (go off hook). However, the carrier from the remote modem will never arrive since the remote calling device was not a modem. The Modem Use Monitor has a condition called incomplete call. The incomplete call is established if the modem rings for less than four times without carrier coming up. If the modem rings for more than four times without carrier coming up, then this is established as a ring-no-answer condition.

When a new service is initially planned, an estimate of the incoming traffice must be made to determine the required number of telephone lines, automatic answering modems, and computer ports required to satisfactorily handle the service. If this quantity of equipment is estimated low, then some of incoming callers will receive busy signals. If the amount of equipment is estimated high, then unneeded costs are incurred because of equipment and telephone liens sitting idle.

Referring now to FIG. 1, a system block diagram is shown with the modem use monitor (MUM) referred to generally by the numeral 10. In automatic answering systems as described above, a modem of data communication equipment (DCE) 12 is connected to the host computer or the data terminal equipment (DTE) 14. Usually, the modem and the host computer are connected through a standard cable 16 with 25-pin connectors (RS-232) 18 at either end thereof. With some degree of standardization in the modem field, pin 8 of the RS-232 is a data carrier detect (DCD) line. Although more than one intercepted line could be used for the current or similar system, the first embodiment described herein is operated with the interception of only the DCD signal in a manner which is transparent to the DTE computer. All MUM data is derived from this input. To this end, an intercept connector 20 is placed mediate the ends of cable 16 and branches the DCD signal 22 to the MUM input board 24 of the MUM 10. While only a single modem 12 and intercept connector 20 are shown, each MUM 10 can accommodate inputs from up to 64 modems. As will be described in greater detail hereinbelow, the MUM 10 may be used to monitor several (up to eight) rotary hunt groups.

Upon receiving the DCD input, the MUM input board 24, in turn, provides the signal to a panel display of light emitting diodes 26, to a modem status register 28, and to a microcomputer or central processing unit (CPU) 30. The CPU 30 is also provided with information through terminal 32, particularly time and information to set the real time clock and calendar portion of the CPU. After processing the data, information as to performance of each modem being monitored is provided to the 24-hour summary memory 36 and to the printer which, in turn, provides a summary chart (not shown).

Figure 2:
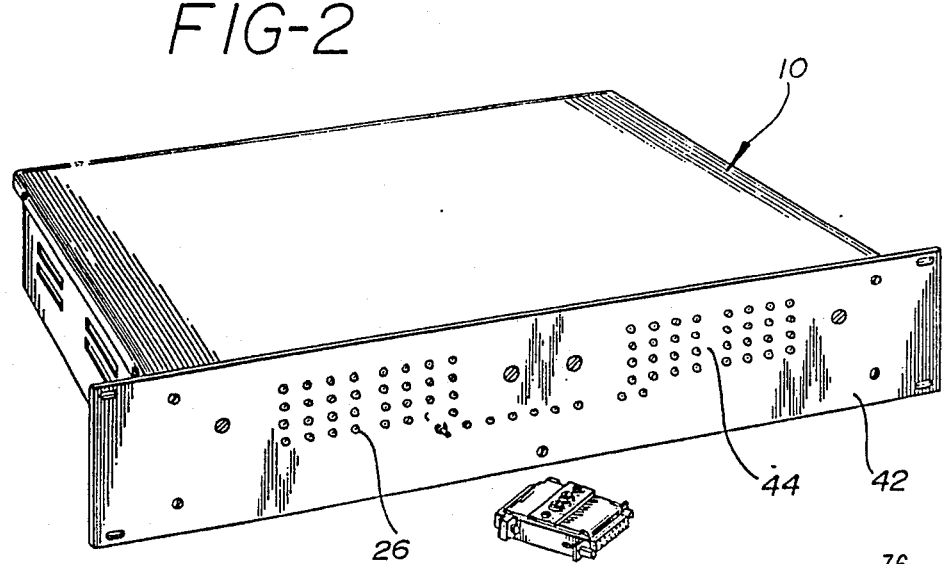
FIG. 2 is a front view of the modem use monitor and particularly shows the front panel array of indicators.

Reference is now made to FIG. 2 in which further details of the modem use monitor 10 are shown. The front panel 42 has an array 44 of the light emitting diodes (LED) 26 with each LED identified as to a particular modem monitored. The array 44 is constructed so that, when a particular DCD signal is received, the corresponding LED is illuminated. This indicates that the modem is in use. Besides displaying the in-use condition of the modem, the MUM 10 takes he information and places the data into the modem status register 28 which, in turn, is compiled as histogram 40.

Figure 3:
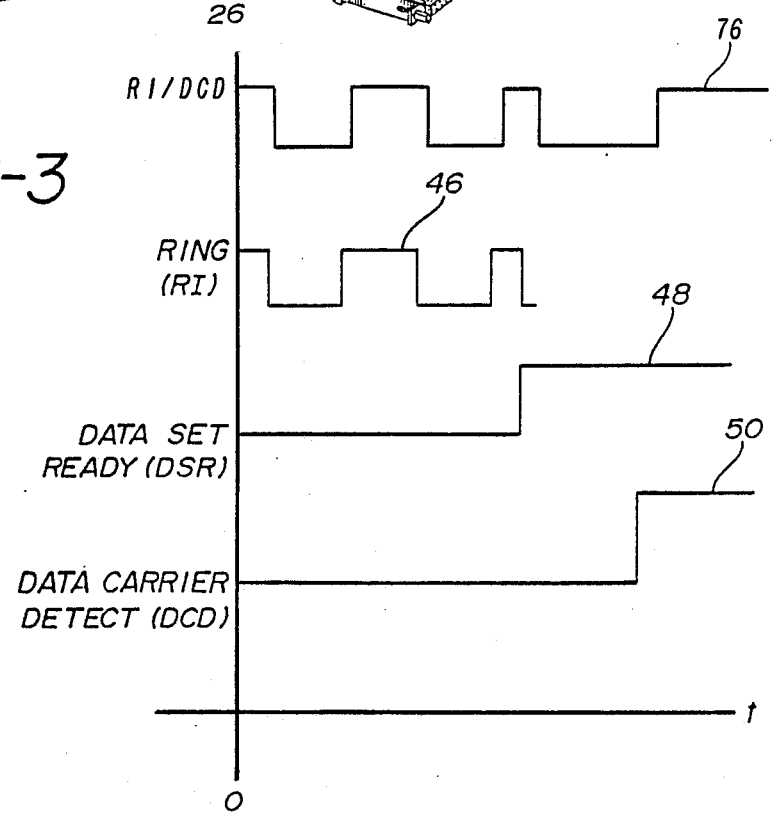
FIG. 3 is a timing diagram showing the relationship between the ring indicator signal and the data set ready and data carrier detect signals.

To further understand the sequence of signal applications, in FIG. 3, the timing diagram for the modem use monitor is provided. The relationship of ring indicator (RI) 46 to data set ready (DSR) 48 and data carrier detect (DCD) 50 is shown. Under normal operating conditions, upon automatic answering the RI signal 46 ceases and the DCD signal 50 is used to ascertain the compatability of the transmitting and receiving devices. When the compatibility of devices is ascertained, the DCD signal 50 locks in and data transmission ensues. An understanding of the relationship among the RI signal 46, DSR signal 48 and DCD signal 50 is particularly important to following the interpretation of the histogram record described below. The histogram 40 of FIG. 4, by way of example, consists of three subhistograms, namely, Group I for modems 1 through 13; Group II, modems 14 through 34; and Group III, modems 35 through 64.

Figure 5:
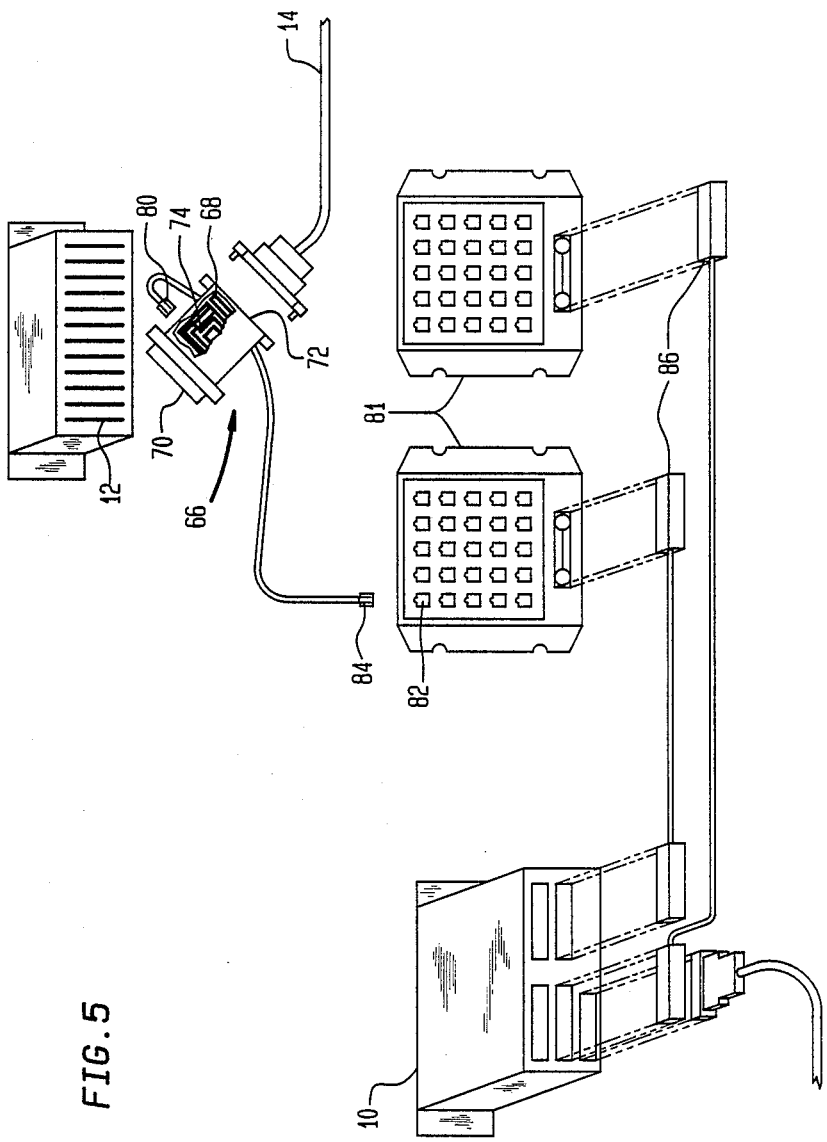

Referring now to FIGS. 3 and 5, a second embodiment of the intercept portion is shown and is referred to generally by numeral 66. This intercept portion 66 is constructed to include an intercept printed-circuit board 68, a male edge connector (RS-232C) 70 for connecting the printed circuit board 68 to the modem 12, and a female edge connector (RS-232C) 72 for connecting the printed circuit board 68 to the host computer 14. In contradistinction to the first embodiment, the second embodiment does not rely solely upon the interception of DCD signal 22 and the derivation of all the MUM data therefrom. In this embodiment, the intercept portion further includes the facility: (1) to intercept multiple signals; (2) by using a logic circuitry within the intercept portion, to preprocess two or more signals; and (3) to provide CPU-generated signals to the modem for support functions.

If the aforedescribed modem is one in which the ring indicator signal causes the data terminal ready signal from the connected equipment to be activated, then in turn data set ready is activated and the modem goes into an off-hook condition to establish carrier. Because the signals do not appear simultaneously but appear sequentially, two or more signals can be logically combined (using OR circuits) within the intercept device. The combining of the ring indicated with data set ready and carrier detect into a single MUM input provides a cost saving. Accordingly, multiple signals including, but not limited to, any or all of the following: for dial-up line applications - data carrier detect (DCD) signal, ring indicator (RI) signal, data terminal ready (DTR) signal, high or low speed (SPEED) signal, and data set ready (DSR) signal; and, for leased line applications - data carrier detect (DCD) signal, signal quality detect (SQD) signal, data terminal ready (DTR) signal, receive data (RX) signal, transmit data (TX) signal, and unattended auto dial back up (UADBU) signal may be intercepted by intercept portion 66 and preprocessed by an intercept circuit means 72. Exemplary of the preprocessing at the intercept portion 66 is the combining of the RI signal (46) and the DCD signal 50 by a logical OR circuit 74 and producing an RI/DCD signal 76 at the intercept output 78. By preprocessing signals at the intercept portion 66, the wiring to the MUM system is simplified and the number of inputs to the MUM. In the example provided, the RI/DCD signal 76 is examined by the MUM/CPU 30 without the concomitant need to review the modems lower in the numbered sequence for indication of DCD signal being present. For leased line applications and further exemplary of the preprocessing at the intercept portion 66 is the combining of the RX signal and the TX signal by a logical OR circuit and producing an RX/TX signal at the intercept output.

The RX/TX signal may be utilized for leased line data communications systems that include a polling-type form of data collection and, within this framework, for detection of computer malfunctions. As to the provision of CPU-generated signals, for dial-up line applications, a busy (BUSY) signal is supplied; and for leased line applications, an inhibit UADBU (UADBU) signal is supplied.

Simultaneously with the development of preprocessing in the intercept portion, further improvements were made in the connector/harnessing configurations so as to enhance modem vendor independence of the MUM unit and to facilitate utilization of the MUM unit. Accordingly, an intercept output connector 80 is used in conjunction with a modular connector block 81. In the best mode of practicing the invention the intercept output connector 78 is a socket connector 82 in communication with a pin connector 84. (These connectors are commonly designated "RJ-12 connectors" and provide from 1 to 5 pins for intercept output and a common ground plane.) From the modem intercept portion 66 to the modular block 80 an RS 12 cable is utilized. From the modular block 80 to the MUM input board 24, cables 86 with standard 25 pin connectors are utilized.

In operation, the MUM unit is utilized for analyzing modem defects by the method described hereinbelow.

The modems are formed into one or more groups thereof, and within each group, and the modems sequentially serve a rotary hunt arrangement of telephone lines for data communications purposes. When in use, each modem has a data carrier detect signal present. The method comprises the steps of:

a. intercepting the data carrier signal for each modem;

b. sequentially processing within each group each data carrier detect signal within recurring predetermined time periods, typically one minute intervals, to provide an indication of the presence or absence of the data carrier signal and, within the predetermined time period, repeating the sequential processing several times so as to validate the data initially accumulated;

c. storing in a register the data carrier detect signal status for each modem during each predetermined time period;

d. examining the register to corroborate that all lower-in-sequence modems were responsive to the data carrier detect signal status examination preferably in reverse sequential order; and, e. indicating in a histogram form non-use, initiation-of-use, continuation-of-use and improper use of each said modem and, additionally any of the following steps;

f. transferring to a memory data stored in the register;

g. clearing the register at the conclusion of the predetermined time period;

h. summarizing the modem activity for each 24-hour period on a 24-hour summary chart.

i. computing the modem utilization factor in Erlangs according to the following formula:

$$\frac{N_1 + N_2 + N_3 \ldots N_{60}}{60}$$

wherein $N_1$ = number of modems "ON" during minute 1

$N_2$ = number of modems "ON" during minute 2

$N_3$ = number of modems "ON" during minute 3

．
．
．

$N_{60}$ = number of modems "ON" during minute 60 j. branching the intercepted data carrier detect signal for each modem to a panel; and, k. displaying at the panel typically by a light emitting diode for each modem, the ring signal and the data carrier detect signal status for each modem.

Figure 4:
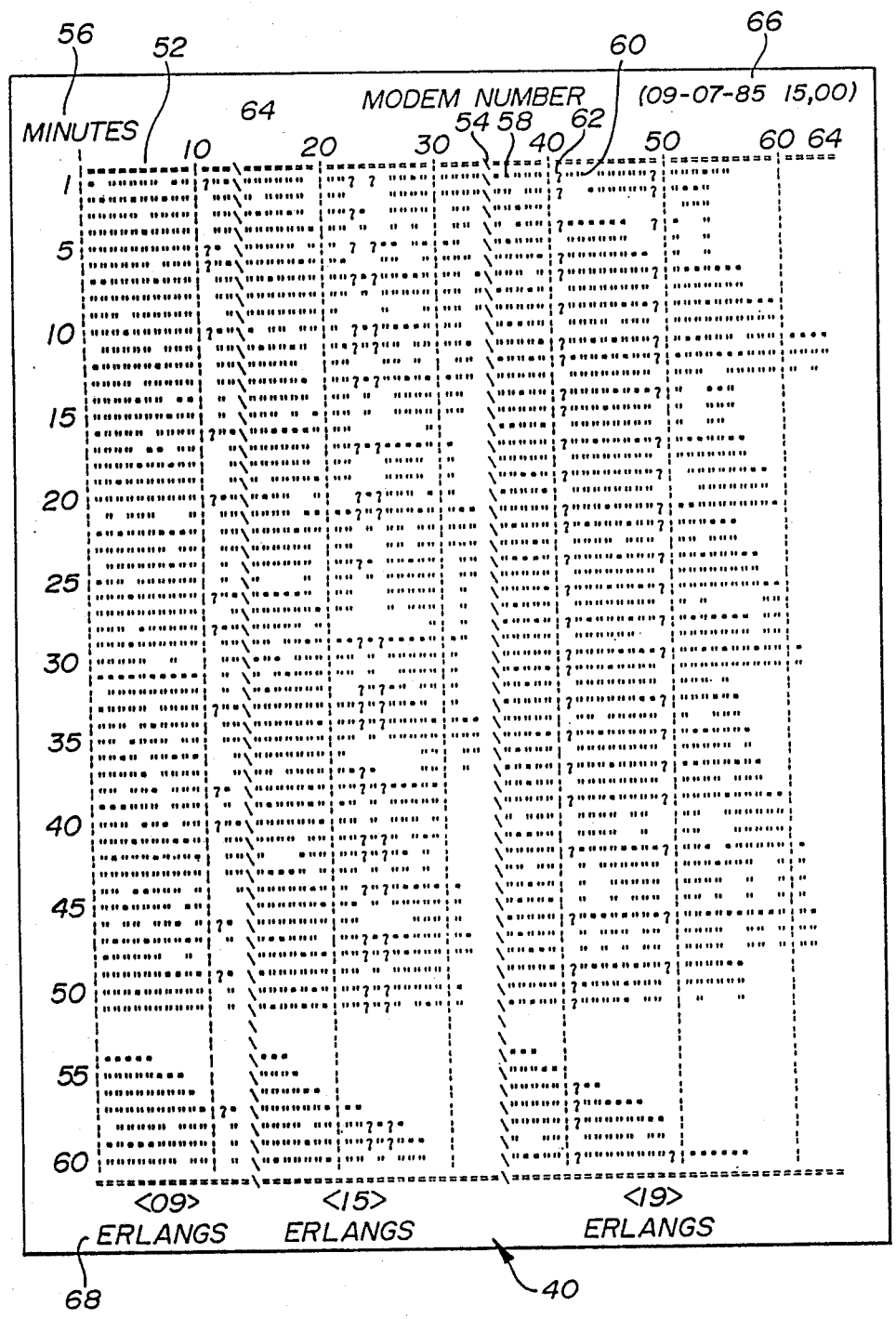
FIG. 4 is a histogram for three groups of modems, numbered 1 through 13, 14 through 34; and 35 through 64; showing unit-time field in which initiation-of-use, continuation-of-use, and improper-use symbols are imprinted; and, upon completion of the histogram, the modem utilization factor is imprinted adjacent each group, and, FIG. 5 is a diagram of an improved intercept device system providing ready accessibility to modems and facilitating wiring and harnessing.

As an alternate to the histogram presented as FIG. 4 hereof, a computer generated exception report is provided as shown in table 1 below.

TABLE I

| EXCEPTION REPORT | | | |
|---|---|---|---|
| 11 | 09-07-84 | 15:01 | SKIPPED LINE |
| 23 | 09-07-84 | 15:01 | RING NO ANSWER |
| 25 | 09-07-84 | 15:01 | SKIPPED LINE |
| 41 | 09-07-84 | 15:01 | RING NO ANSWER |
| 50 | 09-07-84 | 15:01 | SKIPPED LINE |
| 41 | 09-07-84 | 15:02 | RING NO ANSWER |
| 50 | 09-07-84 | 15:02 | SKIPPED LINE |
| 23 | 09-07-84 | 15:03 | RING NO ANSWER |
| 63 | 09-07-84 | 15:03 | OUT OF SEQUENCE CALL |
| 03 | 09-07-84 | 15:07 | LEASED LINE CARRIER LOSS |
| 11 | 09-07-84 | 15:10 | SKIPPED LINE |
| 23 | 09-07-84 | 15:10 | RING NO ANSWER |
| 25 | 09-07-84 | 15:10 | SKIPPED LINE |
| 41 | 09-07-84 | 15:11 | RING NO ANSWER |
| 50 | 09-07-84 | 15:11 | SKIPPED LINE |
| 41 | 09-07-84 | 15:12 | RING NO ANSWER |
| 50 | 09-07-84 | 15:12 | SKIPPED LINE |
| 23 | 09-07-84 | 15:13 | RING NO ANSWER |
| 63 | 09-07-84 | 15:14 | OUT OF SEQUENCE CALL |
| 06 | 09-07-84 | 15:17 | LEASED LINE CARRIER LOSS |

```
|        |        |      TIME and PROBLEM
|        |               MUM PORT and DATE
```

The Modem Use Monitor Exception Reporting Option is a firmware change to the MUM unit which replaces the histogram with a list of errors as they occur.

In addition to monitoring hunt groups, the ER option allows for connection of leased lines to the first group in the system. The loss of carrier on any modem in this group will generate an error report.

Due to the limitation of printers (130 chrs/line), MUM units over 64 ports contain only firmware for the exception report (ER) or NETWORK WINDOWS (NW).

In the best mode of operation, it is preferable to, in step f. above, increment to memory whenever each data carrier detect signal is indicated as being present at a modem.

Although the best mode of the invention has been described herein in some detail, it has not been possible to include each and every variation. Those skilled in the art of modem use monitors will be able to make slight variations in the arrangement suggested hereby without departing from the spirit of the invention and still be within the scope of the claim appended hereto.

What is claimed is:

1. A device for analyzing modem defects among a plurality of modems formed into one or more groups thereof, each said group of modems sequentially serving a rotary hunt arrangement of telephone lines for data communications, said device receiving one or more signals from and for each said modem comprising:

a plurality of intercept means, one for each modem, each for providing at least one combined signal for examination, said combined signal formed by selectively preprocessing two or more intercepted said signals;

central processing means for processing the one or more signals from each said itnercept means and, in turn, being responsive to the condition of said signals, and providing responses for each modem on a periodic basis;

register means for storing said responses for each modem in numbered sequence;

said central processing means further for examining said register means upon acquisition of each said response and, defect-reporting means for recording all responses from said register means for a given period;

whereby modem defects are apparent upon examination of the defect-reporting means.

2. A device as described in claim 1 wherein one of said intercept means is a data carrier detect signal.

3. A device as described in claim 2 wherein one of said intercepted signals preprocessed by said intercept means is a ring indicator signal.

4. A device as described in claim 3 wherein a signal provided by said intercept means is a logically preprocessed signal combining said data carrier detect and said ring indicator signals.

5. A device as described in claim 4 further comprising a display panel means for displaying the data carrier detect signal status for each modem.

6. A device as described in claim 5 wherein said display means has a light emitting diode for each modem which, when illuminated, shows the presence of data carrier detect detect at said modem.

7. A device as described in claim 2 wherein said central processing means in turn further comprises computing means for computing a modem utilization factor.

8. A device as described in claim 7 wherein said modem utilization factor is computed in Erlangs according to the following formula:

$$\frac{N_1 + N_2 + N_3 \ldots N_{60}}{60}$$

wherein $N_1$ = number of modems "ON" during minute 1

$N_2$ = number of modems "ON" during minute 2

$N_3$ = number of modems "ON" during minute 3

．
．
．

$N_{60}$ = number of modems "ON" during minute 60

9. A device as described in claim 8 further comprising:

memory means for storing summarized information from said register means.

10. A device as described in claim 9 wherein said memory means is further providing a 24-hour summary chart listing, for each hour, $N_1 + N_2 + N_3 \ldots N_{60}$ whereby an overview of the activity for each day is displayed.

11. A device as described in claim 1 wherein said defect-reporting means is a histogram.

12. A method of analyzing modem defects among a plurality of modems formed into one or more groups thereof, the modems within each said group sequentially serving a rotary hunt arrangement of telephone lines for data communications and having one or more signals from and for each said modem present when in use, said method comprising the steps of:
   a. intercepting at least one of said signals for each said modem;
   b. sequentially processing within each group each said signal within recurring predetermined time periods to provide an indication of the condition of the signal;
   c. storing in a register the signal status for each modem during each predetermined time period;
   d. indicating in a defect-reporting form non-use, initiation-of-use, continuation-of-use and improper use of each said modem.

13. A method as described in claim 12 further comprising the step of
   e. examining said register to corroborate that all lower-in-sequence modems were responsive to the data carrier detect signal status; and, 14. A method as described in claim 13 wherein said examining step reviews the lower-in-sequence modems in reverse sequential order.

15. A method as described in claim 12 wherein the predetermined time period is one minute.

16. A method as described in claim 15 further comprising the steps of:
   f. transferring to a memory data stored in said register;
   g. clearing the register at the conclusion of said predetermined time period; and,
   h. summarizing the modem activity for each 24-hour period on a 24-hour summary chart.

17. A method as described in claim 16 wherein an intercepted signal is a data carrier detect signal and wherein the transferring includes the substep of incrementing the memory upon each data carrier detect signal indicated as present at a modem.

18. A method as described in claim 17 wherein step (b) is repeated a plurality of times within the predetermined time period to validate the data initially accumulated.

19. A method as described in claim 17 further comprising the steps of:
   j. branching the intercepted data carrier detect signal for each modem to a panel; and,
   k. displaying at the panel the data carrier detect signal status for each modem.

20. A method as described in claim 19 wherein said panel has a light emitting diode for each modem, which, when illuminated, shows the presence of said data carrier detect signal.

21. A device for analyzing modem defects among a plurality of modems formed into one or more groups thereof, each said group of modems serving an arrangement of telephone lines for data communications with a host computer comprising:
   a plurality of intercept means, one for each modem, each for providing at least one signal for examination, said intercept means, in turn, comprising
      intercept branching means for branching at least one said signal present at an output port of said modem;
      an intercept connector connecting said intercept branching means to said modem output port;
      a computer connector connecting said intercept branching means to said host computer;
   central processing means for processing the signal from each said intercept means and, in turn, being responsive to the presence and absence of said signals, and providing responses for each modem on a periodic basis;
   register means for storing said responses for each modem in numbered sequence;
   defect-reporting means for recording all responses from said register means for a given period showing data carrier detect present, said carrier detect absent, and modem answering out-of-sequence;
   whereby modem defects are apparent upon examination of the defect-reporting means.

22. A device as described in claim 21 wherein a signal provided by said intercept means is a data carrier detect signal.

23. A device as described in claim 22 wherein a signal provided by said intercept means is a ring indicator signal.

24. A device as described in claim 23 wherein said intercept branching means further includes:
   first circuit means for bussing all inputs present at said intercept connector to said computer connector; and
   second circuit means for prepocessing said data carrier detect and said ring indicator signals.

25. A device as described in claim 24 wherein said second circuit means is a logical or circuit combining said data carrier detect and said ring indicator signal into a single signal to be monitored.

26. A device as described in claim 21 wherein a signal provided by said intercept means is a ring indicator signal.

27. A device as described in claim 21 wherein said intercept means provides up to five signals for examination.

28. A device as described in claim 27 wherein said intercept means further includes a modem use monitor connector.

29. A device as described in claim 28 wherein said modem use monitor connector from each intercept means is an RJ-12 connector.

30. A device as described in claim 21 wherein said intercept connector is an RS-232-C connector.

31. A device as described in claim 21 wherein said computer connector is an RS-232-C connector.

* * * * *